(12) United States Patent
Hoshi et al.

(10) Patent No.: US 11,772,478 B2
(45) Date of Patent: Oct. 3, 2023

(54) VEHICLE

(71) Applicant: Mazda Motor Corporation, Hiroshima (JP)

(72) Inventors: Hideyuki Hoshi, Hiroshima (JP); Masakazu Okada, Hiroshima (JP); Keishi Hirotaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 107 days.

(21) Appl. No.: 17/500,967

(22) Filed: Oct. 14, 2021

(65) Prior Publication Data

US 2022/0126672 A1 Apr. 28, 2022

(30) Foreign Application Priority Data

Oct. 22, 2020 (JP) .................... 2020-177370

(51) Int. Cl.
*B60K 6/46* (2007.10)
*B60K 6/24* (2007.10)
*B60K 6/26* (2007.10)
*B60K 13/04* (2006.01)
*B60L 50/11* (2019.01)
*B60K 6/36* (2007.10)
*F16N 31/00* (2006.01)

(52) U.S. Cl.
CPC ............... *B60K 6/46* (2013.01); *B60K 6/24* (2013.01); *B60K 6/26* (2013.01); *B60K 6/36* (2013.01); *B60K 13/04* (2013.01); *B60L 50/11* (2019.02); *F16N 31/00* (2013.01); *B60L 2210/10* (2013.01)

(58) Field of Classification Search
CPC ... B60K 6/46; B60K 6/24; B60K 6/26; B60K 6/36; B60K 13/04; B60L 50/11; B60L 2210/10; F16N 31/00
See application file for complete search history.

(56) References Cited

U.S. PATENT DOCUMENTS

2021/0008971 A1* 1/2021 Toda .................... B60W 50/082

FOREIGN PATENT DOCUMENTS

| JP | 2004153897 A | * | 5/2004 |
| JP | 2015-220830 A | | 12/2015 |
| JP | 2019-163026 A | | 9/2019 |
| JP | 2020-090172 A | | 6/2020 |

OTHER PUBLICATIONS

Extended European search report dated Feb. 23, 2022, in corresponding European patent Application No. 21198188.1, 7 pages.
Office Action dated Mar. 25, 2023, in corresponding Chinese patent Application No. 202111036675.8, 12 pages.

* cited by examiner

*Primary Examiner* — John D Walters
(74) *Attorney, Agent, or Firm* — XSENSUS LLP

(57) ABSTRACT

A vehicle is provided which can reduce an influence on an occupant space due to location and arrangement of an inverter. The vehicle includes a longitudinal engine, a motor, a transmission, and an inverter. The motor is located behind the longitudinal engine. The transmission 13 has a transmission casing and is adjacently located behind the motor. The transmission is arranged below a floor tunnel. The inverter is mounted below the floor tunnel and on an upper portion of the transmission casing.

12 Claims, 7 Drawing Sheets

VEHICLE

CROSS-REFERENCE TO RELATED APPLICATION

The present application claims priority to Japanese Patent Application 2020-177370, filed Oct. 22, 2020, the entire contents of which are incorporated herein by reference.

BACKGROUND

Field

The present disclosure relates to a vehicle, particularly to a vehicle including an engine and a motor as drive sources for vehicle traveling.

Description of the Related Art

In recent years, for the purpose of decreasing environmental loads and so forth, hybrid vehicles have been spreading which include a motor as a drive source for vehicle traveling in addition to an engine.

Patent Literature 1 discloses a vehicle including an engine and a motor as drive sources for vehicle traveling. In the vehicle disclosed in Patent Literature 1, the engine is a four-cylinder engine and is installed in the vehicle by longitudinal placement in which the cylinders are positioned in a vehicle front-rear direction. The motor is arranged in the rear with respect to the engine in the vehicle front-rear direction and is connected with an output shaft of the engine via a clutch. A transmission is arranged further in the rear of the motor.

In the vehicle disclosed in Patent Literature 1, an electric power conversion apparatus including an inverter is mounted on a side portion of a transmission casing in the transmission. Direct-current electric power from a battery is converted to alternating-current electric power by the inverter and supplied to the motor.

CITATION LIST

Patent Literature

[Patent Literature 1] Japanese Patent Laid-Open No. 2015-220830

SUMMARY

Technical Problems

However, a vehicle disclosed in the above Patent Literature 1 has a problem that because of an electric power conversion apparatus mounted on a side portion of a transmission, an occupant space becomes narrow in a vehicle width direction. That is, in a case where a longitudinal engine is employed, the transmission is arranged below a floor tunnel, and in a case where the electric power conversion apparatus is mounted on the side portion of a transmission casing, the width (the dimension in the vehicle width direction) of the floor tunnel needs to be increased by the size of the electric power conversion apparatus.

In a case where the width of the floor tunnel is increased, foot spaces of occupants including a driver are influenced. Consequently, in the vehicle of the above Patent Literature 1 which employs a structure in which the electric power conversion apparatus is mounted on the side portion of the transmission casing, the positions of pedals to be operated by the driver have to be arranged to be offset to positions deviated from ergonomically ideal positions. Thus, in a case where the driver drives the vehicle disclosed in the above Patent Literature 1, fatigue of the driver may be increased.

The present disclosure has been made to solve the above problems, and an object of the present disclosure is to provide a vehicle that can reduce an influence on an occupant space due to arrangement of an inverter.

Means for Solving the Problems

A vehicle according to one aspect of the present disclosure includes: a longitudinal engine that has plural cylinders and is installed such that the plural cylinders are positioned in a vehicle front-rear direction; a motor that is located behind the longitudinal engine in the vehicle front-rear direction and is capable of generating a driving force for vehicle traveling; a transmission that has a transmission mechanism and a transmission casing housing the transmission mechanism, is adjacently located behind the motor in the vehicle front-rear direction, and is coupled with the motor; and an inverter that converts input direct-current electric power to alternating-current electric power and outputs the alternating-current electric power to the motor, in which a floor tunnel bulging toward an inside of a vehicle cabin and extending in the vehicle front-rear direction is formed in a floor panel of the vehicle, the transmission is arranged below the floor tunnel, and the inverter is mounted below the floor tunnel and on an upper portion of the transmission casing.

In the vehicle according to the above aspect, the inverter is mounted on the upper portion of the transmission casing below the floor tunnel. Thus, in the vehicle according to the above aspect, compared to a vehicle which is disclosed in the above Patent Literature 1 and in which an electric power conversion apparatus such as an inverter is mounted on a side portion of a transmission casing, the width (the dimension in a vehicle width direction) of the floor tunnel can be prevented from being increased. Consequently, in the vehicle according to the above aspect, a foot space of an occupant is less likely to be constricted, and the positions of pedals to be operated by a driver are easily arranged in ergonomically ideal positions. Thus, in the vehicle according to the above aspect, the driver is less likely to be fatigued.

In the vehicle according to the above aspect, the motor may have a rotor, a stator, and a motor casing housing the rotor and the stator, and the upper portion of the transmission casing may be placed in a lower position in a vehicle up-down direction than an upper end portion in an outer peripheral surface of the motor casing.

In the vehicle according to the above aspect, the upper portion of the transmission casing is placed in a lower position than the upper end portion in the outer peripheral surface of the motor casing. Consequently, in the vehicle according to the above aspect, the inverter is arranged by effectively using a level difference between the upper end portion in the outer peripheral surface of the motor casing and the upper portion of the transmission casing, and arrangement of the inverter with high space efficiency can thereby be realized.

In the vehicle according to the above aspect, when an imaginary line in parallel with an axis of a rotation shaft in the motor is drawn from the upper end portion of the outer peripheral surface of the motor casing, the inverter may be arranged to fall within a portion below the imaginary line.

In the vehicle according to the above aspect, because the inverter is arranged to fall within a portion below the imaginary line, a situation can be avoided in which the floor tunnel protrudes upward in a portion in which the inverter is arranged. Consequently, in the vehicle according to the above aspect, in a vehicle cabin, a space for a section (a front console, a center console) arranged above the floor tunnel can be prevented from being constricted.

In the vehicle according to the above aspect, an exhaust pipe that is connected with the longitudinal engine, guides exhaust gas exhausted from the longitudinal engine to a vehicle rear side, and discharges the exhaust gas, and a front propeller shaft for transmitting a driving force output from the transmission to a front wheel may further be included, and around the transmission casing, the exhaust pipe may be arranged on one lateral side in a vehicle width direction and the front propeller shaft may be arranged on another lateral side in the vehicle width direction.

In the vehicle according to the above aspect, although the exhaust pipe is arranged on one lateral side of the transmission casing and the front propeller shaft is arranged on the other lateral side, the inverter can be prevented from interfering with those. That is, because the inverter is mounted on the upper portion of the transmission casing, interference with the exhaust pipe and the front propeller shaft can be avoided. Further, the inverter is mounted on the upper portion of the transmission casing, the exhaust pipe is arranged on the lateral side of the transmission casing, and heat from the exhaust pipe can thereby also be prevented from influencing the inverter.

In the vehicle according to the above aspect, the transmission may further have an oil pan that is mounted on a lower portion of the transmission casing and is for storing hydraulic oil.

In the vehicle according to the above aspect, although the oil pan is mounted on the lower portion of the transmission casing, the inverter is mounted on the upper portion of the transmission casing, and interference between the inverter and the oil pan can thus also be avoided.

In the vehicle according to the above aspect, a DC-DC converter that converts a voltage of input direct-current electric power and outputs the direct-current electric power to a load of the vehicle may further be included, and the DC-DC converter may be arranged below the floor panel and in a region adjacent to the floor tunnel in a vehicle width direction.

In the vehicle according to the above aspect, the DC-DC converter is arranged in the region adjacent to the floor tunnel, and the width of the floor tunnel thereby does not need to be increased for disposing the DC-DC converter. Note that the DC-DC converter does not output electric power to the motor and thus does not necessarily need to be arranged in a vicinity region of the motor. Consequently, as described above, the DC-DC converter is capable of being arranged in the region adjacent to the floor tunnel.

In the vehicle according to the above aspect, an engine room may be provided in a front portion of the vehicle, the floor tunnel may be provided to extend from the engine room toward a vehicle rear side, and the longitudinal engine and the motor may be installed in the engine room provided in the front portion of the vehicle.

In the vehicle according to the above aspect, the longitudinal engine and the motor are installed in the engine room in the front portion of the vehicle. In this form, although the transmission arranged below the floor tunnel is positioned around foot parts of front seats, the inverter is mounted on the upper portion of the transmission casing as described above, and it thereby becomes possible to prevent foot spaces of occupants (such as a driver) to be seated on the front seats from being constricted.

Advantages

A vehicle according to each of the above aspects can reduce an influence on an occupant space due to arrangement of an inverter.

DESCRIPTION OF EMBODIMENTS

Figure 1:
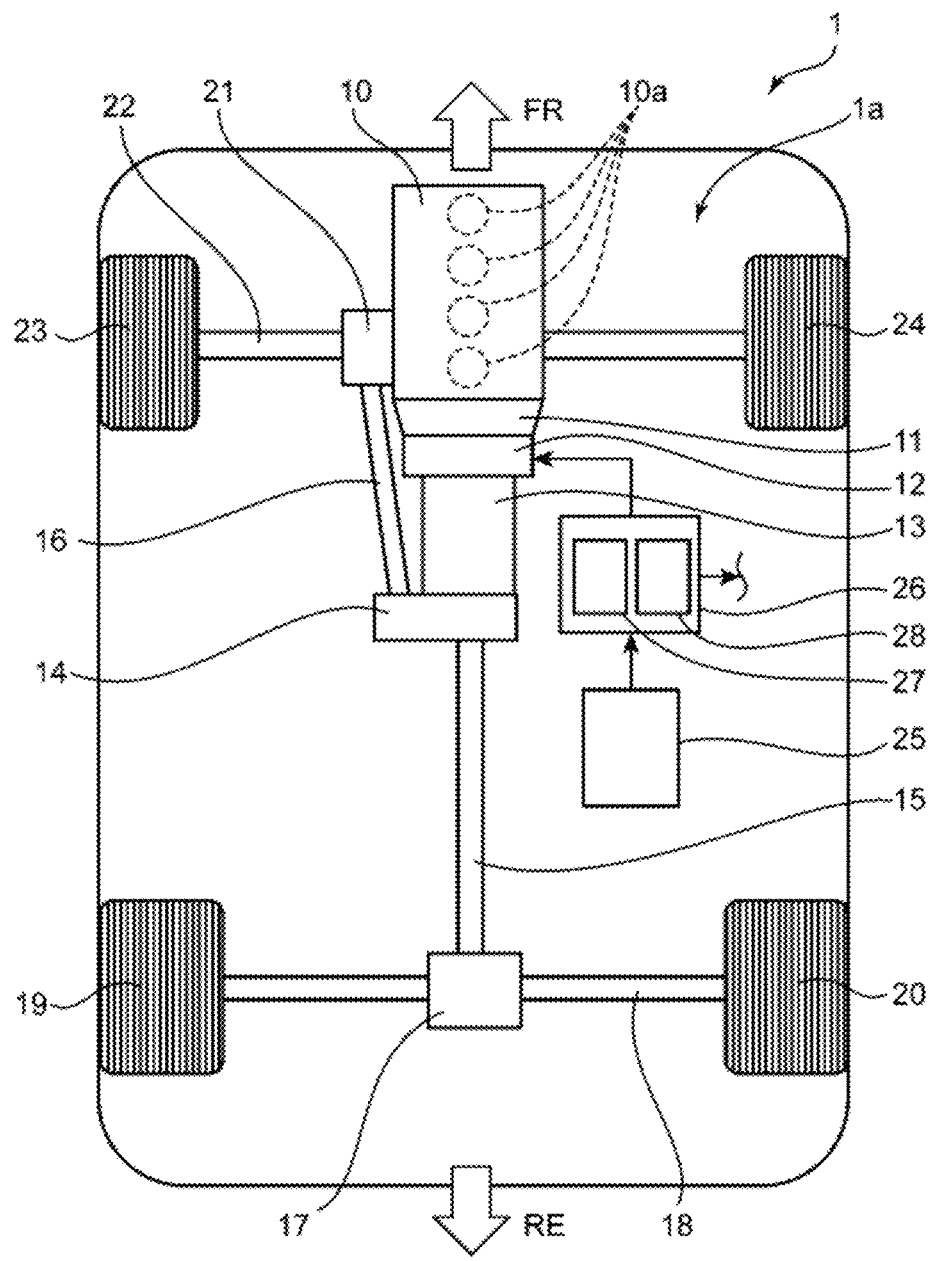
FIG. 1 is a schematic diagram illustrating a configuration of a vehicle according to an exemplary embodiment of the present disclosure.

An embodiment of the present disclosure will hereinafter be described with reference to drawings. Note that the embodiment described in the following is one example of the present disclosure, and the present disclosure is not limited by the following embodiment at all except inherent configurations of the present disclosure.

In the drawings used in the following description, "FR" denotes the vehicle front side, "RE" denotes the vehicle rear side, "UP" denotes the vehicle upper side, "LO" denotes the vehicle lower side, "RI" denotes the vehicle right side, and "LE" denotes the vehicle left side.

1. Outline Configuration of Vehicle 1

An outline configuration of a vehicle 1 according to the present embodiment will be described by using FIG. 1.

As illustrated in FIG. 1, the vehicle 1 includes an engine 10 and a motor 12 as drive sources for vehicle traveling. The engine 10 and the motor 12 are installed in an engine room 1a provided in a front portion of the vehicle 1. The engine 10 has plural cylinders 10a and is arranged by longitudinal placement such that the plural cylinders 10a are aligned in a front-rear direction of the vehicle 1. That is, in the present embodiment, the engine 10 is a longitudinal engine.

Note that the vehicle 1 according to the present embodiment is capable of employing either one of a gasoline engine and a diesel engine as the engine 10.

The motor 12 is located behind the engine 10 in the front-rear direction of the vehicle 1. Furthermore, a rotation shaft of the motor 12 is coupled with an output shaft of the engine 10 via a damper 11. Either one or both of the engine 10 and the motor 12 generate a driving force for vehicle traveling in accordance with a traveling condition of the vehicle 1. Note that the damper 11 provided between the engine 10 and the motor 12 is a device for buffering an impact torque between the engine 10 and the motor 12.

The vehicle 1 also includes a transmission 13, a transfer case 14, propeller shafts 15 and 16, differential gears 17 and 21, drive shafts 18 and 22, and wheels 19, 20, 23, and 24. The transmission 13 is coupled with the motor 12. To the transmission 13, in addition to the driving force from the motor 12, the driving force from the engine 10 is also input through the motor 12. The transmission 13 changes the speed of the driving force at a ratio corresponding to the traveling condition and outputs the driving force to the transfer case 14.

Note that the vehicle 1 according to the present embodiment is capable of employing either one of a manual transmission and an automatic transmission as the transmission 13.

The transfer case 14 is a motive power division apparatus and is a device that divides the driving force output from the transmission 13 into a driving force for front wheels 23 and 24 and a driving force for rear wheels 19 and 20. With the transfer case 14, a rear (R) propeller shaft 15 and a front (F) propeller shaft 16 are coupled.

Note that the ratio of distribution of the driving forces by the transfer case 14 may successively be changed in accordance with a road surface μ or the like.

The R propeller shaft 15 is provided to extend rearward from the transfer case 14 in a vehicle front-rear direction. A back end of the R propeller shaft 15 is coupled with a rear (R) differential gear 17. A rear (R) drive shaft 18 extends from the R differential gear 17 toward both sides in a vehicle width direction. The rear wheels 19 and 20 are mounted on both ends of the R drive shaft 18.

The F propeller shaft 16 is provided to extend forward in the vehicle front-rear direction through a lateral side of the transmission 13, the motor 12, and the damper 11 in the vehicle width direction. A front end of the F propeller shaft 16 is coupled with a front (F) differential gear 21. A front (F) drive shaft 22 extends from the F differential gear 21 toward both sides in the vehicle width direction. The front wheels 23 and 24 are mounted on both ends of the F drive shaft 22.

In addition, the vehicle 1 includes a battery 25 and an electric power conversion unit 26. The battery 25 is a battery module configured with plural batteries each of which is a lithium-ion battery. The electric power conversion unit 26 is connected with the battery 25.

The electric power conversion unit 26 has an inverter 27 and a DC-DC converter 28. The inverter 27 is a device that converts direct-current electric power input from the battery 25 to alternating-current electric power and outputs the electric power to the motor 12. The DC-DC converter 28 is a device that converts (steps up or down) a voltage of the direct-current electric power input from the battery 25 and outputs the electric power to various kinds of loads of the vehicle 1.

2. Transmission 13 and Peripheral Structure Thereof

The transmission 13 and a peripheral structure thereof in the vehicle 1 will be described by using FIG. 2 to FIG. 4.

Figure 2:
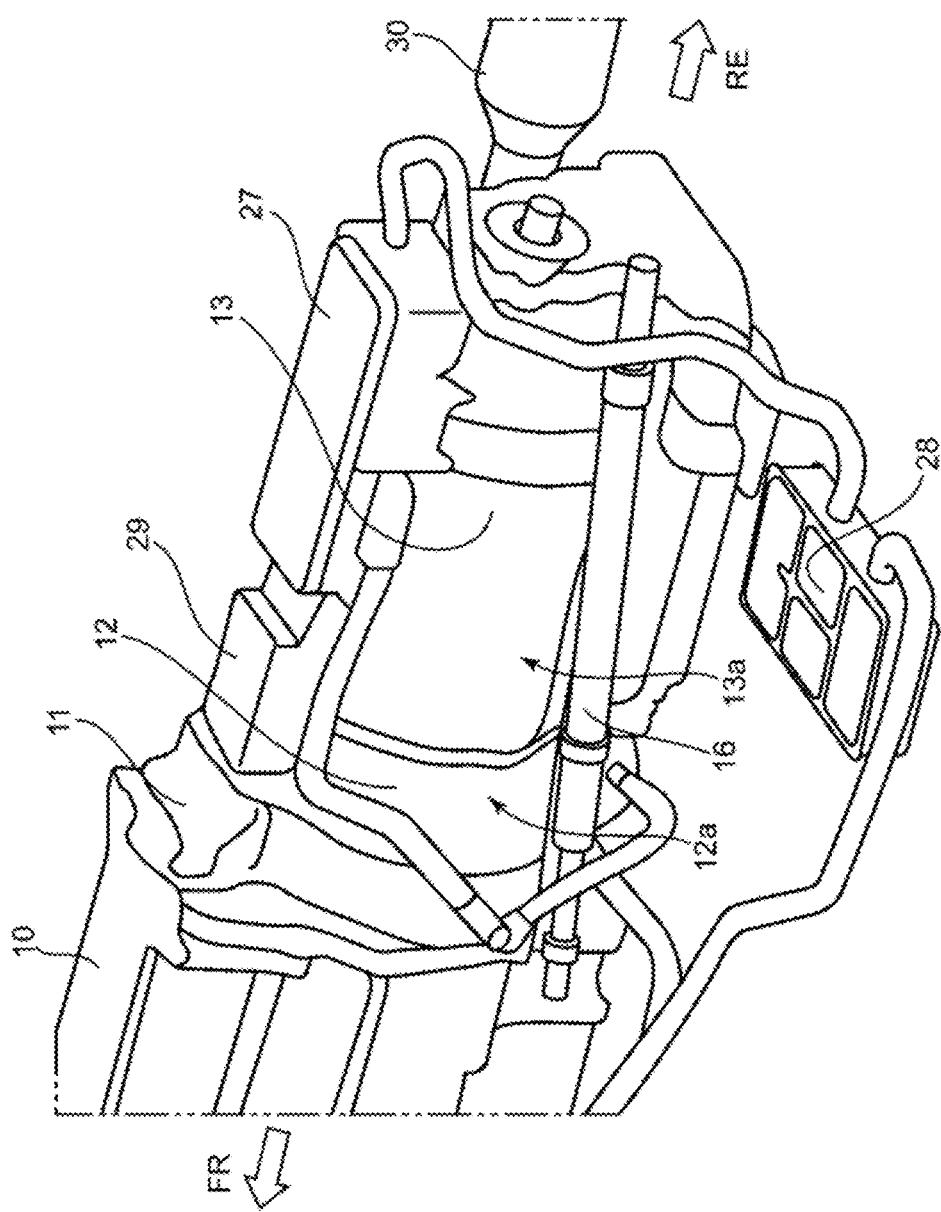
FIG. 2 is a perspective view of a transmission in the vehicle and a peripheral structure thereof as seen from an obliquely upper side.
Figure 3:
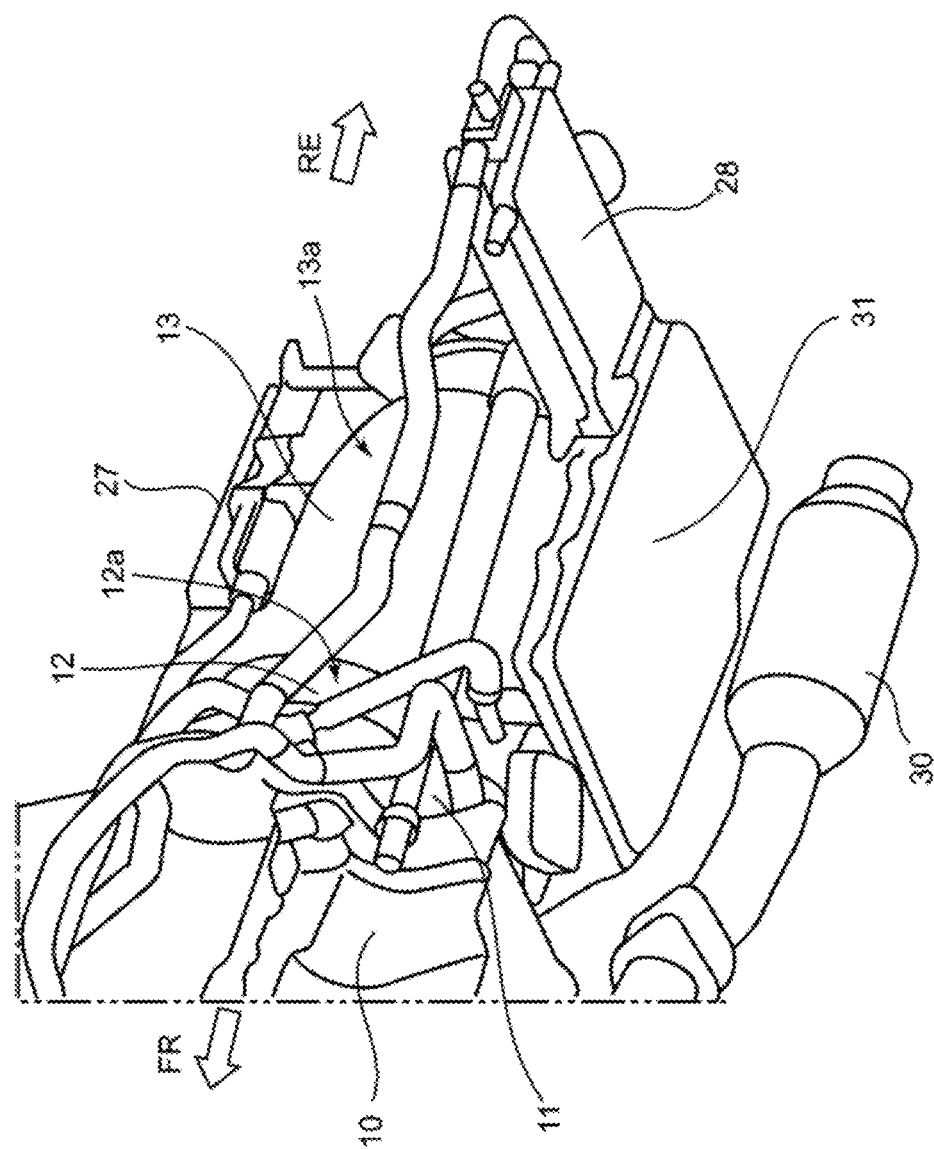
FIG. 3 is a perspective view of the transmission in the vehicle and the peripheral structure thereof as seen from an obliquely lower side.
Figure 4:
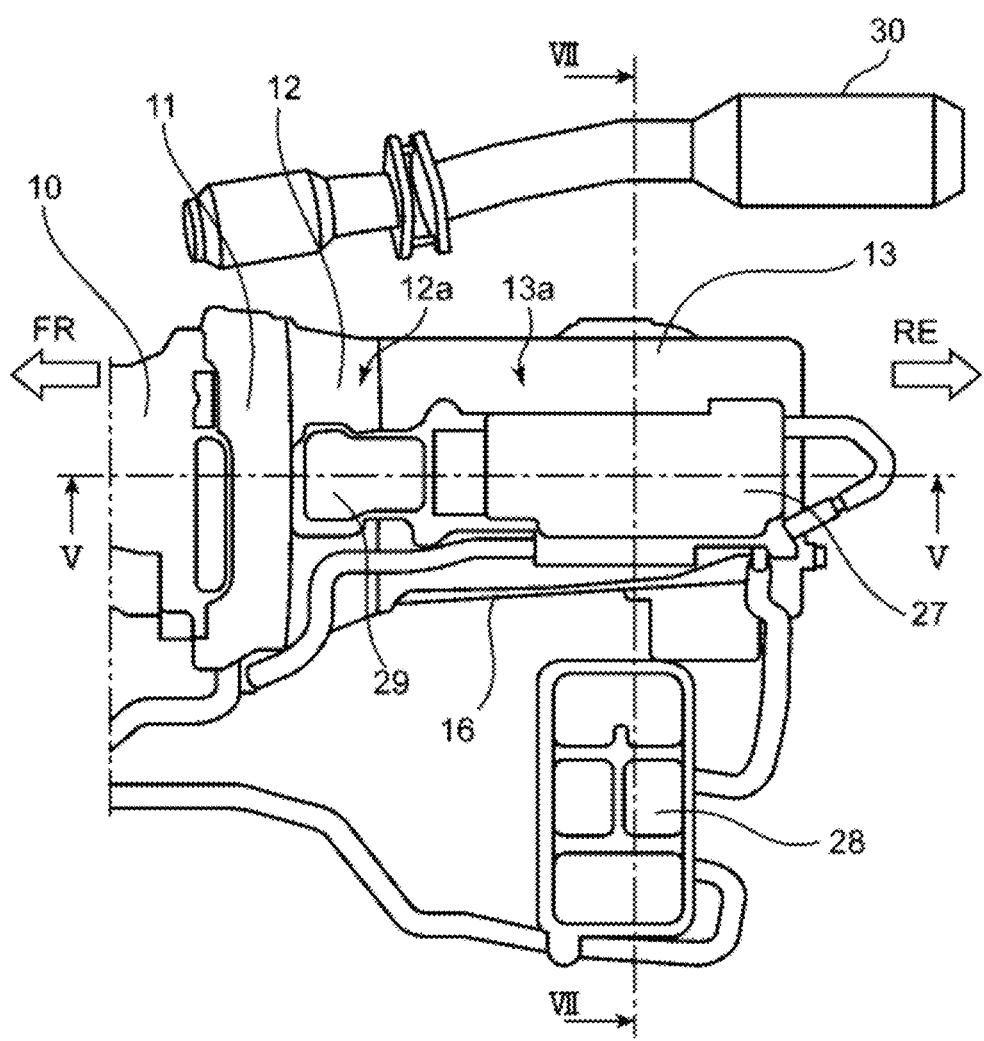
FIG. 4 is a plan view of the transmission in the vehicle and the peripheral structure thereof as seen from above.

As illustrated in FIG. 2 to FIG. 4, the motor 12 has a motor casing 12a, and the transmission 13 has a transmission casing 13a. The motor casing 12a is a tubular outer shell member and houses a rotor and a stator (not illustrated) in an internal portion. The transmission casing 13a is a tubular outer shell member which has a smaller diameter and is longer than the motor casing 12a and houses a transmission mechanism (not illustrated) in an internal portion.

The inverter 27 is mounted on an upper portion of the transmission casing 13a. The inverter 27 is arranged to fall within the upper portion of the transmission casing 13a in the vehicle front-rear direction. That is, the inverter 27 is arranged not to stick out from the transmission casing 13a in the vehicle front-rear direction and the vehicle width direction.

As illustrated in FIG. 2 and FIG. 4, a terminal block 29 is mounted on a region from the upper portion of the transmission casing 13a to an upper portion of the motor casing 12a. The terminal block 29 is a member which houses a terminal and a bus bar for electrically connecting the inverter 27 and the motor 12 together.

As illustrated in FIG. 2 to FIG. 4, the DC-DC converter 28 is set apart from the transmission casing 13a on one lateral side in the vehicle width direction and is placed below a lower portion of the transmission casing 13a in a vehicle up-down direction. An arrangement form of the DC-DC converter 28 will be described later.

The F propeller shaft 16 is disposed in a state where a gap is provided with respect to the transmission casing 13a and the motor casing 12a. The F propeller shaft 16 is arranged on the same side as the side in the vehicle width direction on which the DC-DC converter 28 is arranged. The F propeller shaft 16 is arranged in a region closer to the transmission casing 13a and so forth than the DC-DC converter 28.

As illustrated in FIG. 4, an exhaust pipe 30 is arranged in a lateral side region on an opposite side, with respect to the transmission casing 13a, to a side in the vehicle width direction on which the DC-DC converter 28 and the F propeller shaft 16 are arranged. Although not illustrated in detail, the exhaust pipe 30 is connected with an exhaust manifold of the engine 10 and is provided to extend rearward in the vehicle front-rear direction.

As illustrated in FIG. 3, an oil pan 31 is mounted on the lower portion of the transmission casing 13a. The oil pan 31 is a container for storing hydraulic oil of the transmission 13.

3. Arrangement of Transmission 13 and Inverter 27 in Floor Tunnel 1d

A description will be made about arrangement of the transmission 13 and the inverter 27 in a floor tunnel 1d by using FIG. 5 and FIG. 6.

Figure 5:
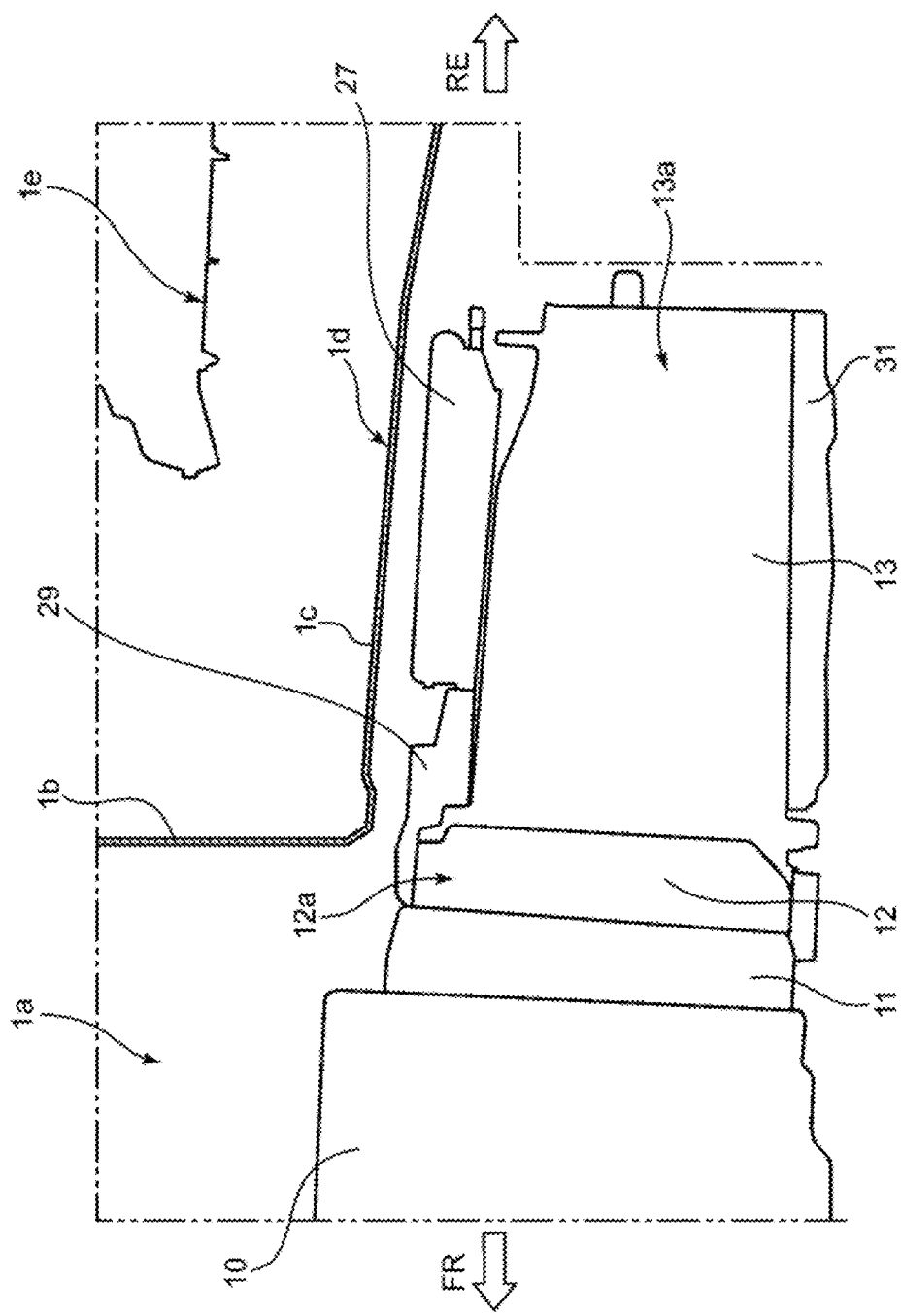
FIG. 5 is a cross-sectional view illustrating a cross-section taken along line V-V in FIG. 4.

As illustrated in FIG. 5, in the vehicle 1, the engine room 1a is partitioned from a vehicle cabin by a dash panel 1b. A floor panel 1c continuous with the dash panel 1b is provided in a lower portion of the vehicle cabin. Furthermore, in a central region of the floor panel 1c in the vehicle width direction, the floor tunnel 1d is provided which bulges upward (toward a vehicle cabin inside) in the vehicle up-down direction and extends in the vehicle front-rear direction.

In the vehicle 1, the engine 10, the damper 11, and the motor 12 are arranged in the engine room 1a. The transmission 13 and the inverter 27 are arranged below the floor tunnel 1d.

Figure 6:
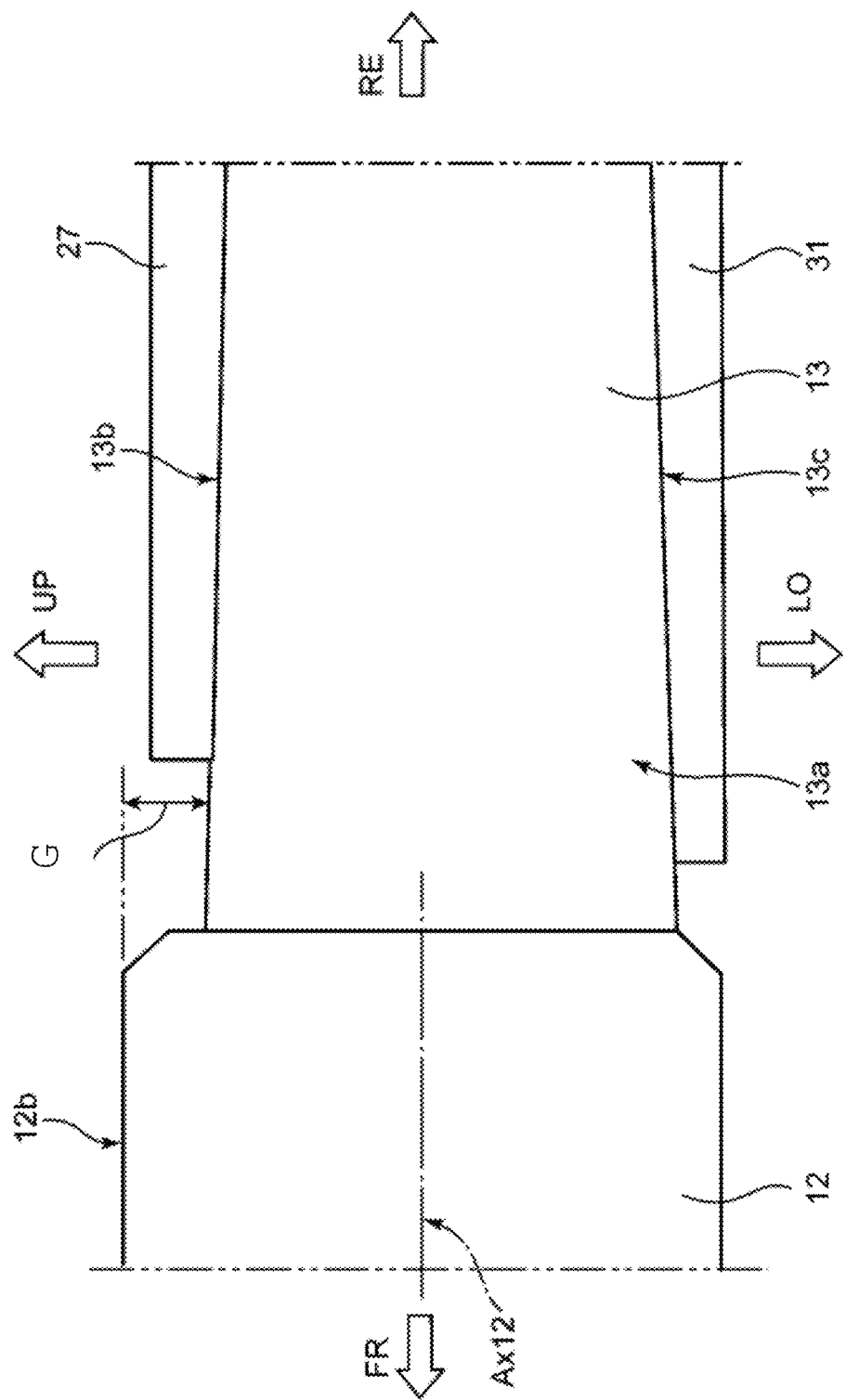
FIG. 6 is a schematic diagram illustrating the positional relationship among a motor, the transmission, and an inverter.

Here, as illustrated in FIG. 6, in the vehicle up-down direction, an upper portion 13b of the transmission casing 13a is placed in a lower position than an upper end portion 12b in an outer peripheral surface of the motor casing 12a. That is, a height difference G is provided in the vehicle up-down direction between the upper portion 13b of the transmission casing 13a and the upper end portion 12b in the outer peripheral surface of the motor casing 12a. In the vehicle 1 according to the present embodiment, the inverter 27 is located and arranged by effectively using the height difference G.

In addition, when an imaginary line LN12 in parallel with an axis Ax12 of the rotation shaft of the motor 12 is drawn from the upper end portion 12b in the outer peripheral surface of the motor casing 12a, the inverter 27 is mounted on the upper portion 13b of the transmission casing 13a such that in the vehicle up-down direction, the inverter 27 falls within a portion below the imaginary line LN12 in the vehicle up-down direction. In the vehicle 1 according to the present embodiment, because the inverter 27 is arranged to fall within the height difference G in the vehicle up-down direction, the floor tunnel 1d does not need to be partially swollen to protrude upward in a portion in which the inverter 27 is arranged. Consequently, in the vehicle 1, in the vehicle cabin, a space for a section (a front console, a center console) 1e arranged above the floor tunnel 1d can be prevented from being constricted.

Note that as illustrated in FIG. 6, the oil pan 31 is mounted on a lower portion 13c of the transmission casing 13a and thus does not influence the floor tunnel 1d.

4. Arrangement Relationship Between DC-DC Converter 28, Exhaust Pipe 30, and Oil Pan 31 and Inverter 27

A description will be made about the arrangement relationship between the DC-DC converter 28, the exhaust pipe 30, and the oil pan 31 and the inverter 27 by using FIG. 7.

Figure 7:
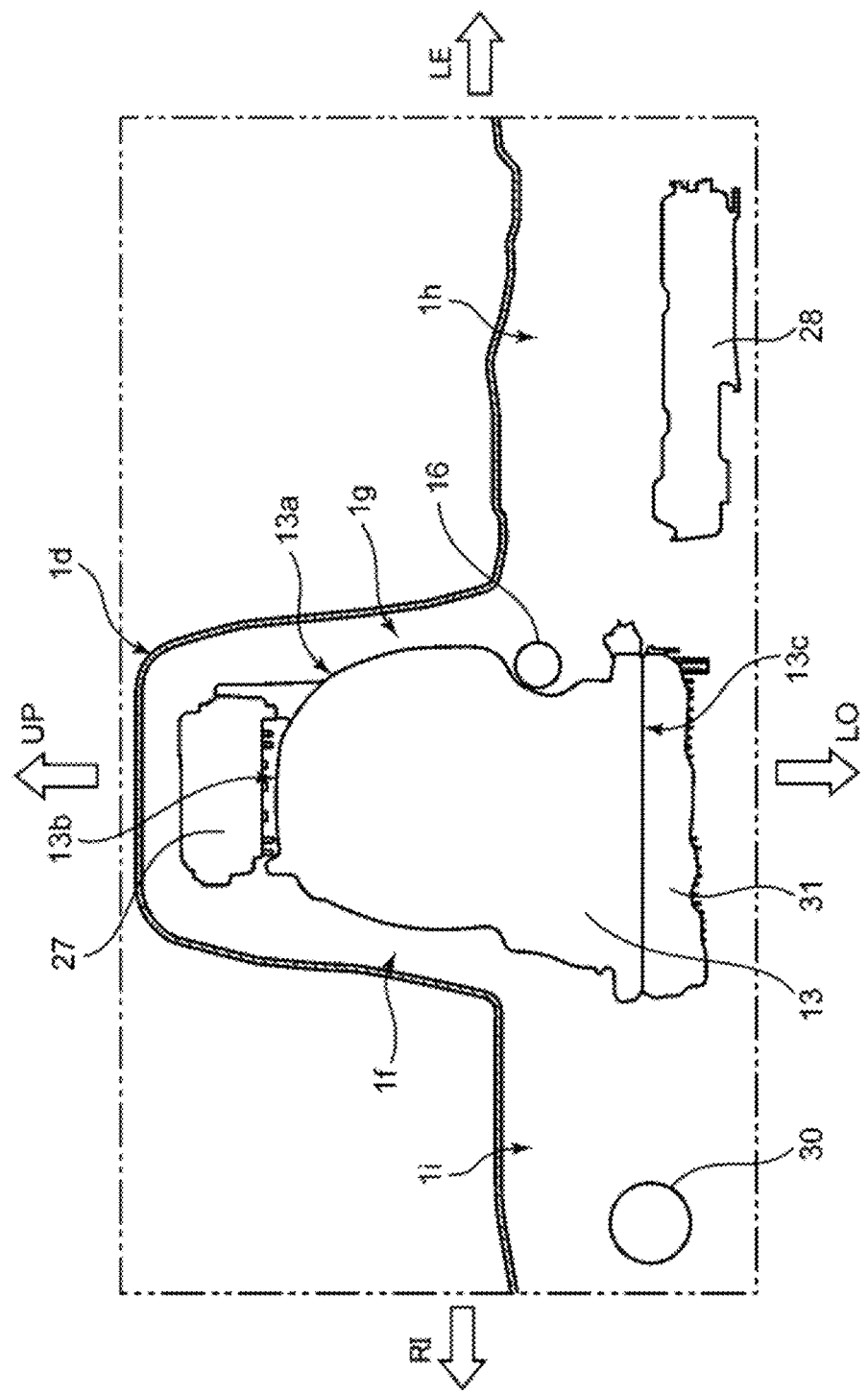
FIG. 7 is a cross-sectional view illustrating a cross-section taken along line VII-VII in FIG. 4.

As illustrated in FIG. 7, in the vehicle 1, the inverter 27 is mounted on the upper portion 13b of the transmission casing 13a below the floor tunnel 1d. Thus, in the vehicle 1, compared to a case where the inverter 27 is placed on a lateral side 1f or 1g in the vehicle width direction by mounting the inverter 27 on a side portion of the transmission casing 13a, the dimension (width) of the floor tunnel 1d in the vehicle width direction does not have to be increased.

The F propeller shaft 16 is arranged below the floor tunnel 1d and on the lateral side 1g of the transmission casing 13a. Meanwhile, the inverter 27 is mounted on the upper portion 13b of the transmission casing 13a and thus does not interfere with the F propeller shaft 16.

The DC-DC converter 28 is arranged below the floor panel 1c and in a left vicinity region 1h in the vehicle width direction with respect to the floor tunnel 1d. The inverter 27 is mounted on the upper portion 13b of the transmission casing 13a and thus does not interfere with the DC-DC converter 28.

The exhaust pipe 30 is arranged below the floor panel 1c and in a right vicinity region 1i in the vehicle width direction with respect to the floor tunnel 1d. The inverter 27 is mounted on the upper portion 13b of the transmission casing 13a and thus does not interfere with the exhaust pipe 30 either. Further, the inverter 27 is mounted on the upper portion of the transmission casing 13b below the floor tunnel 1d and is less likely to be influenced by heat from the exhaust pipe 30 arranged in the right vicinity region 1i in the vehicle width direction with respect to the floor tunnel 1d.

The oil pan 31 is mounted on the lower portion 13c of the transmission casing 13a. The inverter 27 is mounted on the upper portion 13b of the transmission casing 13a and thus does not interfere with the oil pan 31 either.

5. Effects

In the vehicle 1 according to the present embodiment, the inverter 27 is mounted on the upper portion 13b of the transmission casing 13a below the floor tunnel 1d. Thus, in the vehicle 1, compared to a vehicle which is disclosed in the above Patent Literature 1 and in which an electric power conversion apparatus such as an inverter is mounted on a side portion of a transmission casing, the width (the dimension in the vehicle width direction) of the floor tunnel 1d can be prevented from being increased. Consequently, in the vehicle 1, a foot space of an occupant is less likely to be constricted, the positions of pedals to be operated by a driver are easily arranged in ergonomically ideal positions, and the driver is less likely to be fatigued.

Further, in the vehicle 1 according to the present embodiment, as illustrated in FIG. 6, the upper portion 13b of the transmission casing 13a is placed in a lower position than an upper end portion 13b in the outer peripheral surface of the motor casing 12a. Consequently, in the vehicle 1, the inverter 27 is arranged by effectively using a height difference between the upper end portion 12b in the outer peripheral surface of the motor casing 12a and the upper portion 13b of the transmission casing 13a, and arrangement of the inverter with high space efficiency can thereby be realized. In particular, in the present embodiment, because the inverter 27 is arranged to fall within a region between the imaginary line LN12 and the upper portion 13b of the transmission casing 13a, a situation can be avoided in which the floor tunnel 1d protrudes upward in a portion in which the inverter 27 is arranged. Consequently, in the vehicle 1, in the vehicle cabin, the space for the section (front or center console 1e) arranged above the floor tunnel 1d can be prevented from being constricted.

Further, in the vehicle 1 according to the present embodiment, as illustrated in FIG. 7, the exhaust pipe 30 is arranged in the right vicinity region 1i below the floor panel 1c, and the F propeller shaft 16 is arranged on the lateral side (left side) 1g of the transmission casing 13a below the floor tunnel 1d. Consequently, in the vehicle 1, the inverter 27 mounted on the upper portion 13b of the transmission casing 13a can be prevented from interfering with the exhaust pipe 30 and the F propeller shaft 16.

Further, in the present embodiment, because the inverter 27 is mounted on the upper portion 13b of the transmission casing 13a which is positioned apart from the exhaust pipe 30, heat from the exhaust pipe 30 can also be prevented from influencing the inverter 27.

Further, in the vehicle 1 according to the present embodiment, as illustrated in FIG. 6 and FIG. 7, although the oil pan 31 is mounted on the lower portion 13c of the transmission casing 13a, the inverter 27 is mounted on the upper portion 13b with the transmission casing 13a interposed therebetween, and interference between the inverter 27 and the oil pan 31 can thus also be avoided.

Further, in the vehicle 1 according to the present embodiment, as illustrated in FIG. 7, the DC-DC converter 28 is arranged below the floor panel 1c and in the left vicinity region 1h adjacent to the floor tunnel 1d, and the width of the floor tunnel 1d thereby does not need to be increased for disposing the DC-DC converter 28. Note that the DC-DC converter 28 does not output electric power to the motor 12 and thus does not necessarily need to be arranged in a vicinity region of the motor 12 (in the floor tunnel 1d). Consequently, as in the present embodiment, the DC-DC converter 28 is capable of being arranged in the left vicinity region 1h.

Further, in the vehicle 1 according to the present embodiment, the longitudinally placed engine (longitudinal engine) 10 and the motor 12 are installed in the engine room 1a in the front portion of the vehicle 1. Thus, in the vehicle 1 according to the present embodiment, although the transmission 13 is positioned around foot parts of front seats, the inverter 27 is mounted on the upper portion 13b of the transmission casing 13a, and it thereby becomes possible to prevent foot spaces of occupants (such as a driver) to be seated on the front seats from being constricted.

As described above, the vehicle 1 according to the present embodiment can reduce an influence on an occupant space due to arrangement of the inverter 27.

[Modifications]

In the above embodiment, as illustrated in FIG. 1, the four-cylinder engine 10 is employed as one example, but the present disclosure is not limited to this. For example, it is possible to employ an engine with five or more cylinders, a V-type multi-cylinder engine, or a W-type multi-cylinder engine as well.

Further, in the above embodiment, a four-wheel drive vehicle in which the driving force generated by the engine 10 and the motor 12 is transmitted also to the front wheels 23 and 24 is raised as one example, but the present disclosure is not limited to this. For example, application to an FR vehicle (front-engine, rear-wheel-drive layout) is possible.

Further, in the above embodiment, as illustrated in FIG. 7, the exhaust pipe 30 is arranged on a right side of the transmission casing 13a, and the DC-DC converter 28 is arranged on a left side; however, the present disclosure is not limited to this. For example, the exhaust pipe 30 may be arranged on the left side of the transmission casing 13a, and the DC-DC converter 28 may be arranged on the right side. Further, the DC-DC converter 28 does not necessarily need to be arranged below the floor panel 1c but may be arranged above the floor panel 1c.

Further, in the above embodiment, the damper 11 is provided between the engine 10 and the motor 12, and as the damper 11, various dampers employed for hybrid vehicles are capable of being used. For example, a damper with a limiter can also be employed which has a function of causing a slip in a case where a predetermined torque is exceeded.

Further, in the above embodiment, the electric power conversion unit 26 has the inverter 27 and the DC-DC converter 28, but in the present disclosure, the DC-DC converter 28 is not an essential feature.

Further, in the above embodiment, a configuration is employed in which the engine 10 to the motor 12 are arranged in the engine room 1a, but the present disclosure is not limited to this. For example, it is also possible to employ a form in which the motor 12 is arranged below the floor tunnel 1d.

REFERENCE SIGNS LIST 1 vehicle
1c floor panel
1d floor tunnel
10 engine (longitudinal engine)
12 motor
12a motor casing
12b upper end portion
13 transmission
13a transmission casing
13b upper portion
16 front propeller shaft
27 inverter
28 DC-DC converter
30 exhaust pipe
31 oil pan

The invention claimed is:

1. A vehicle comprising:
a longitudinal engine that has cylinders and is installed such that the cylinders are positioned in a vehicle front-rear direction;
a motor that is arranged in rear with respect to the longitudinal engine in the vehicle front-rear direction and is capable of generating a driving force for vehicle traveling;
a transmission that has a transmission structure and a transmission casing housing the transmission structure, is adjacently arranged behind the motor in the vehicle front-rear direction, and is coupled with the motor;
an inverter that converts input direct-current electric power to alternating-current electric power and outputs the alternating-current electric power to the motor, wherein
a floor tunnel bulging toward an inside of a vehicle cabin and extending in the vehicle front-rear direction is formed in a floor panel of the vehicle,
the transmission is arranged below the floor tunnel, and
the inverter is mounted below the floor tunnel and on an upper portion of the transmission casing;
an exhaust pipe that is connected to the longitudinal engine, guides exhaust gas exhausted from the longitudinal engine to a vehicle rear side, and discharges the exhaust gas; and
a front propeller shaft for transmitting a driving force output from the transmission to a front wheel, wherein
around the transmission casing, the exhaust pipe is arranged on one lateral side in a vehicle width direction and the front propeller shaft is arranged on another lateral side in the vehicle width direction.

2. The vehicle according to claim 1, wherein
the motor has a rotor, a stator, and a motor casing housing the motor and the stator, and
the upper portion of the transmission casing is placed in a lower position in a vehicle up-down direction than an upper end portion in an outer peripheral surface of the motor casing.

3. The vehicle according to claim 2, wherein
when an imaginary line in parallel with an axis of a rotation shaft in the motor is drawn from the upper end portion of the outer peripheral surface of the motor casing, and the inverter is arranged to fall within a portion below the imaginary line.

4. The vehicle according to claim 3, wherein
the transmission has an oil pan that is mounted on a lower portion of the transmission casing and is for storing hydraulic oil.

5. The vehicle according to claim 3, further comprising:
a DC-DC converter that converts a voltage of input direct-current electric power and outputs the direct-current electric power to a load of the vehicle, wherein
the DC-DC converter is arranged below the floor panel and in a region adjacent to the floor tunnel in the vehicle width direction.

6. The vehicle according to claim 3, wherein
an engine room is provided in a front portion of the vehicle,
the floor tunnel is formed to extend from the engine room toward the vehicle rear side, and
the longitudinal engine and the motor are installed in the engine room.

7. The vehicle according to claim 2, wherein
the transmission has an oil pan that is mounted on a lower portion of the transmission casing and is for storing hydraulic oil.

8. The vehicle according to claim 2, further comprising:
a DC-DC converter that converts a voltage of input direct-current electric power and outputs the direct-current electric power to a load of the vehicle, wherein
the DC-DC converter is arranged below the floor panel and in a region adjacent to the floor tunnel in the vehicle width direction.

9. The vehicle according to claim 2, wherein
an engine room is provided in a front portion of the vehicle,
the floor tunnel is formed to extend from the engine room toward the vehicle rear side, and
the longitudinal engine and the motor are installed in the engine room.

10. The vehicle according to claim 1, wherein
the transmission has an oil pan that is mounted on a lower portion of the transmission casing and is for storing hydraulic oil.

11. The vehicle according to claim 1, further comprising:
a DC-DC converter that converts a voltage of input direct-current electric power and outputs the direct-current electric power to a load of the vehicle, wherein
the DC-DC converter is arranged below the floor panel and in a region adjacent to the floor tunnel in the vehicle width direction.

12. The vehicle according to claim 1, wherein
an engine room is provided in a front portion of the vehicle,
the floor tunnel is formed to extend from the engine room toward the vehicle rear side, and
the longitudinal engine and the motor are installed in the engine room.

* * * * *